United States Patent [19]

Koda et al.

[11] Patent Number: 5,675,646
[45] Date of Patent: Oct. 7, 1997

[54] METHOD OF WRITING IDENTIFICATION NUMBER OF ELECTRONIC APPARATUS

[75] Inventors: Tsutomu Koda; Toshihiro Fukuchi, both of Gifu; Kazumasa Ozawa, Ichinomiya; Haruki Ohwaki, Kagamihara, all of Japan

[73] Assignee: Matsushita Electric Industrial Co., Ltd., Osaka, Japan

[21] Appl. No.: 549,753

[22] PCT Filed: Mar. 28, 1995

[86] PCT No.: PCT/JP95/00568

§ 371 Date: Nov. 24, 1995

§ 102(e) Date: Nov. 24, 1995

[87] PCT Pub. No.: WO95/26609

PCT Pub. Date: Oct. 5, 1995

[30] Foreign Application Priority Data

Mar. 28, 1994 [JP] Japan .................. 6-057342

[51] Int. Cl.⁶ .............. H04N 7/167; G06F 19/00; G11C 7/00
[52] U.S. Cl. .............. 380/10; 364/430; 364/431; 364/653; 365/189.01; 380/9
[58] Field of Search .............. 380/9, 10; 365/189.01; 364/712, 653, 430, 431

[56] References Cited

U.S. PATENT DOCUMENTS 3,969,618  7/1976  Strubel et al. .
4,926,264  5/1990  Ohno et al. ................. 380/10
5,091,787  2/1992  Watannabe et al. .
5,544,064  8/1996  Beckwith .................. 364/483

FOREIGN PATENT DOCUMENTS 56-169485  12/1981  Japan .
63-108881   5/1988  Japan .
3-42986A    2/1991  Japan .

*Primary Examiner*—Stephen C. Buczinski

[57] ABSTRACT

The present invention involves a method of writing an identification number of a CATV receiving apparatus and intends to achieve a rapid write operation and reduction in the capacity of a control program. A microcomputer (7) is reset in a first step (15) and a write pin (13) of a memory write unit (10) is brought into direct engagement with an input/output terminal (8a) of a memory (8) in a second step (16). Subsequently, in a third step (17), a preset identification number of the CATV receiving apparatus is written into the memory (8) through the write pin (13), so that the microcomputer (7) need not start any identification number write program and a rapid write operation can be ensured. No identification number write program is required for the microcomputer (7) and therefore, reduction in the capacity of the control program can be realized.

10 Claims, 5 Drawing Sheets

METHOD OF WRITING IDENTIFICATION NUMBER OF ELECTRONIC APPARATUS

TECHNICAL FIELD

The present invention relates to a method of writing an identification number of an electronic apparatus, for example, a cable television receiving apparatus used for cable television (hereinafter referred to as CATV) so that an individual identification number may be applied to a memory built in the CATV receiving apparatus.

BACKGROUND ART

In the CATV system, respective CATV receiving apparatuses have to be serviced individually and to this end, they must be identified. In order to identify each CATV receiving apparatus, an identification number specific to a particular CATV receiving apparatus is stored in a memory of the CATV receiving apparatus. A conventional method of writing an identification number of a CATV receiving apparatus will now be described with reference to FIG. 5.

In FIG. 5, the CATV receiving apparatus incorporates a microcomputer 1 and a memory 2 coupled thereto. An input/output terminal 3 of the microcomputer 1 is detachably connected to an external memory write unit 4.

With the CATV receiving apparatus constructed as above, an identification number is written into the memory 2 in a manner as described below. Firstly, the memory write unit 4 is connected to the input/output terminal 3 of the microcomputer 1. Subsequently, an identification number is delivered from the memory write unit 4 to the input/output terminal 3 of the microcomputer 1. Then, the microcomputer 1 starts a control program for the memory 2 to write the identification number to an identification number storing address on the memory 2.

In the conventional method as mentioned above, the memory write unit 4 is first connected to the input/output terminal 3 of the microcomputer 1 and the identification number is then delivered from the memory write unit 4 to the input/output terminal 3 of the microcomputer 1. However, the microcomputer 1 needs the step of starting the control program for the memory 2 and writing the identification number to the identification number storing address on the memory 2. Accordingly, the time taken for the write operation to proceed is prolonged and besides the control program for writing the identification number to the identification number storing address on the memory 2 is needed, which raises a problem that the program memory capacity increases.

DISCLOSURE OF INVENTION

The present invention contemplates elimination of the above problem and it is an object of the present invention to provide a method of writing an identification number of an electronic apparatus which ensures a rapid write operation of an identification number into the memory and permits reduction in the capacity of the control program.

To accomplish the above object, a method of writing an identification number of an electronic apparatus having a memory and a microcomputer for controlling the memory comprises a first step of resetting the microcomputer, a second step of bringing a write pin of a memory write unit into engagement with an input/output terminal of the memory after the first step, a third step of writing a preset identification number of the electronic apparatus into the memory through the write pin after the second step, a fourth step of separating the write pin from the input/output terminal of the memory after the third step, and a fifth step of releasing the microcomputer from the resetting after the fourth step.

According to this method, since the write pin of the memory write unit is brought into direct engagement with the input/output terminal of the memory in the second step and subsequently in the third step, the preset identification number of the electronic apparatus is written into the memory through the write pin, the microcomputer need not start any identification number write program and hence a rapid write operation can be ensured.

Further, no identification number write program is required for the microcomputer and therefore, reduction in the capacity of the control program can be realized.

BEST MODE FOR CARRYING OUT THE INVENTION

The present invention will now be described by way of example with reference to the accompanying drawings.

(Embodiment 1)

Figure 3:
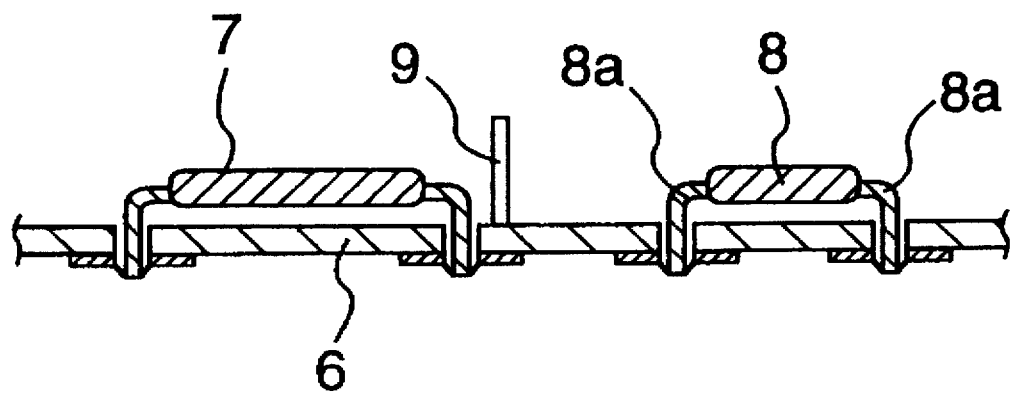
FIG. 3 is a sectional view showing the essential part of the CATV receiving apparatus.

Referring to FIG. 3, a CATV receiving apparatus incorporates a printed-circuit board 6 on which a microcomputer 7 and a memory 8 are mounted. A reset terminal 9 is studded in the printed-circuit board 6 so as to be connected to a reset signal terminal of the microcomputer 7. The memory 8 has an input/output terminal 8a.

Figure 2:
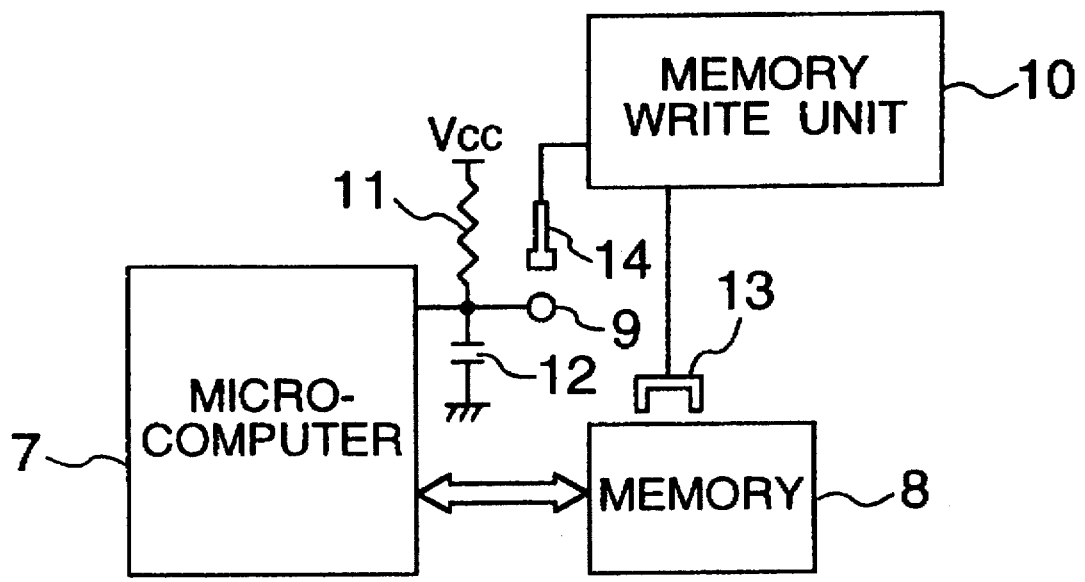
FIG. 2 is a block diagram for explaining the write method.

Referring to FIG. 2, there are illustrated in block view form the microcomputer 7 and memory 8 of the CATV receiving apparatus and a memory write unit 10 which is separate from the CATV receiving apparatus. The microcomputer 7 is coupled with the memory 8 as shown in FIG. 2. The reset terminal 9 connected with the reset signal terminal of the microcomputer 7 is pulled up through a resistor 11. A capacitor 12 is connected between the reset terminal 9 and earth. When the reset terminal 9 is grounded to earth, the microcomputer 7 is initialized and all input/output terminals of the microcomputer 7 assume high impedance. Thus, the memory 8 coupled with one of these input/output terminals is allowed to be freely controlled externally.

The memory write unit 10 has a write pin 13 which extends therefrom. The write pin 13 can be brought into engagement with the input/output terminal 8a of the memory 8. A reset pin 14 also extends from the memory write unit 10 so as to be engageable with the reset terminal 9. The reset pin 14 is connected to earth and hence, with the reset pin brought into engagement with the reset terminal 9, the microcomputer 7 is reset.

Figure 1:
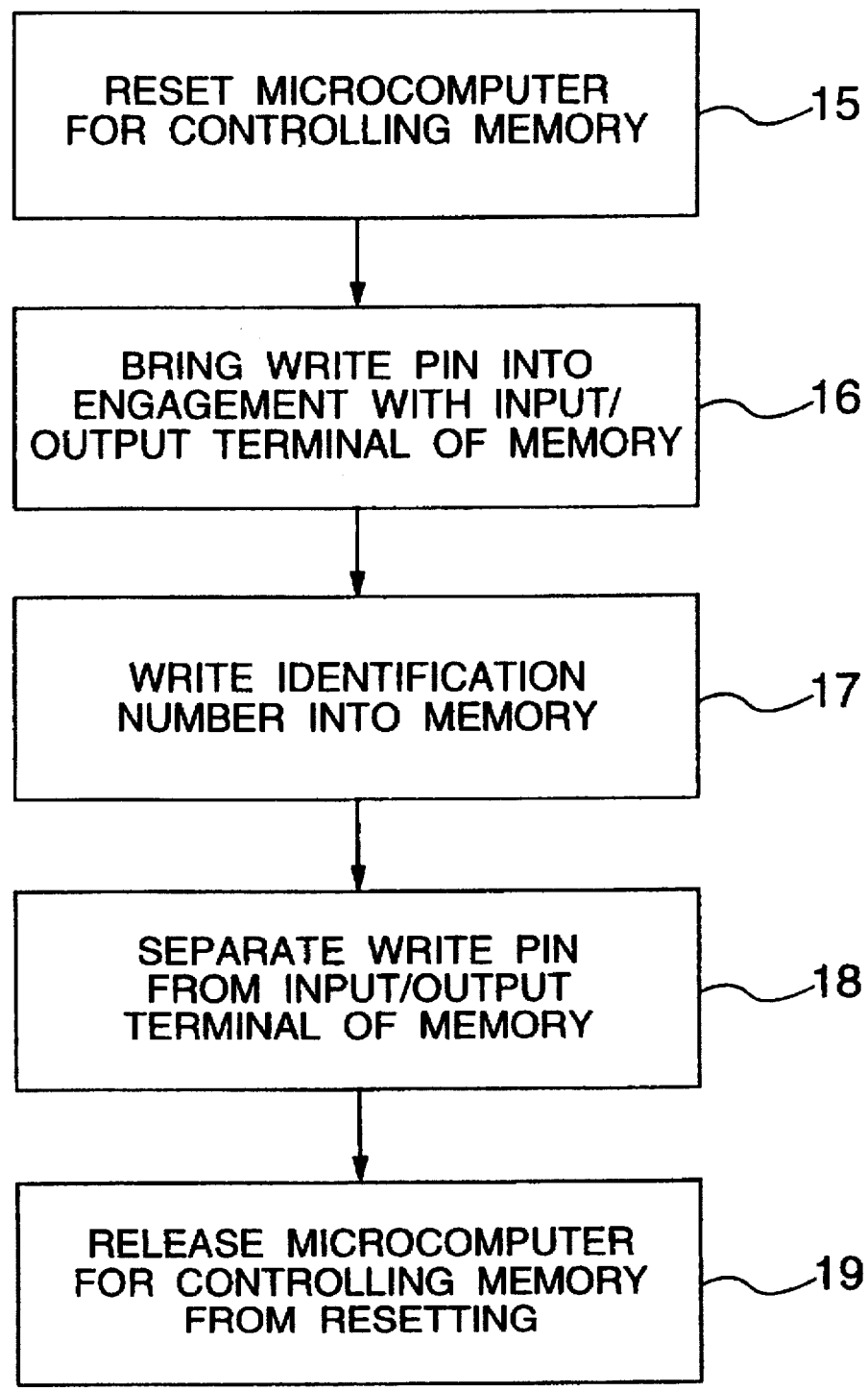
FIG. 1 is a flow chart showing the steps of a method of writing an identification number of a CATV receiving apparatus according to a first embodiment of the present invention.

When the CATV receiving apparatus constructed as described above is conveyed through the production process while being supplied with electric power and comes into the step of writing an identification number into the memory 8, the identification number is written directly into the memory 8 by means of the memory write unit 10 which is always supplied with electric power. This will be detailed below. More particularly, in the CATV receiving apparatus having the memory 8 and the microcomputer 7 for controlling the memory 8, an identification number write operation proceeds as shown in FIG. 1 through a first step 15 of resetting the microcomputer 7, a second step 16 of bringing the write pin 13 of the memory write unit 10 into engagement with the input/output terminal 8a of the memory 8 after the first step 15, a third step 17 of writing a preset identification number of the CATV receiving apparatus into the memory 8 through the write pin 13 after the second step 16, a fourth step 18 of separating the write pin 13 from the input/output terminal 8a of the memory 8 after the third step 17, and a fifth step 19 of releasing the microcomputer 7 from the resetting after the fourth step 18.

Accordingly, in the second step 16, the write pin 13 of the memory write unit 10 is brought into direct engagement with the input/output terminal 8a of the memory 8 and subsequently, in the third step 17, the preset identification number of the CATV receiving apparatus is written into the memory 8 through the write pin 13, so that the microcomputer 7 need not start any identification number write program to thereby ensure a rapid write operation.

In this type of CATV receiving apparatus, making the capacity of the control program as small as possible links to cost reduction. In the present embodiment, no identification number write program is required for the microcomputer 7 and therefore, reduction in the capacity of the control program can be realized.

Further, whether an identification number actually written into the memory 8 by means of the memory write unit 10 coincides with the identification number preset in the memory write unit 10 is decided between the third and fourth steps 17 and 18, and the next procedure is undertaken on the basis of a result of the decision. More particularly, when coincidence occurs, the program proceeds to the fourth step 18 but when non-coincidence occurs, a cycle of operation proceeds in which write operation is repeated and then the above coincidence inspection is carried out. If coincidence cannot be settled even after the cycle of operation has been effected three times, an alarm is rung to call the operator. The operator judges conditions and takes proper measures.

In this manner, the written identification number can be inspected as to whether it is correct. For the identification number, the memory write unit 10 can operate in one mode in which a suitable value is set case by case by the operator or the other mode in which an identification number is written and after coincidence thereof is settled, the identification number is counted up by one. The write pin 13 is caused to engage the input/output terminal 8a of the memory 8 three times, making it possible to remove a coating on the surface of the input/output terminal 8a and ensure steady contact. Accordingly, through use of the write method of the present invention, traces of engagement of the write pin 13 remains on the input/output terminal 8a of memory 8 which has undergone a write operation.

In addition, by making sightly longer (by 1 mm in the present embodiment) an earth pin element of the write pin 13 (the earth pin element being one of pin elements of the write pin 13) than the other pin elements, the earth pin element can be brought into engagement earlier than the other pin elements when the write pin 13 is brought into engagement with the input/output terminal 8a but can be separated later than the other pin elements when the write pin 13 is separated from the input/output terminal 8a. Thus, both of the CATV receiving apparatus and the memory unit 10 can first be maintained at the same earth potential and so stable electrical connection can be realized.

Further, in the present embodiment, the microcomputer 7 has means for inhibiting write operation to an identification number write address on the memory 8. Accordingly, the identification number cannot be freely changed externally without using the write unit 10 and therefore safety can be improved.

The identification number can be prevented from being read to the outside through the microcomputer 7. In other words, in the ordinary use, coincidence of the identification number can be settled only inside the microcomputer 7 so as to further improve safety.

(Embodiment 2)

Figure 4:
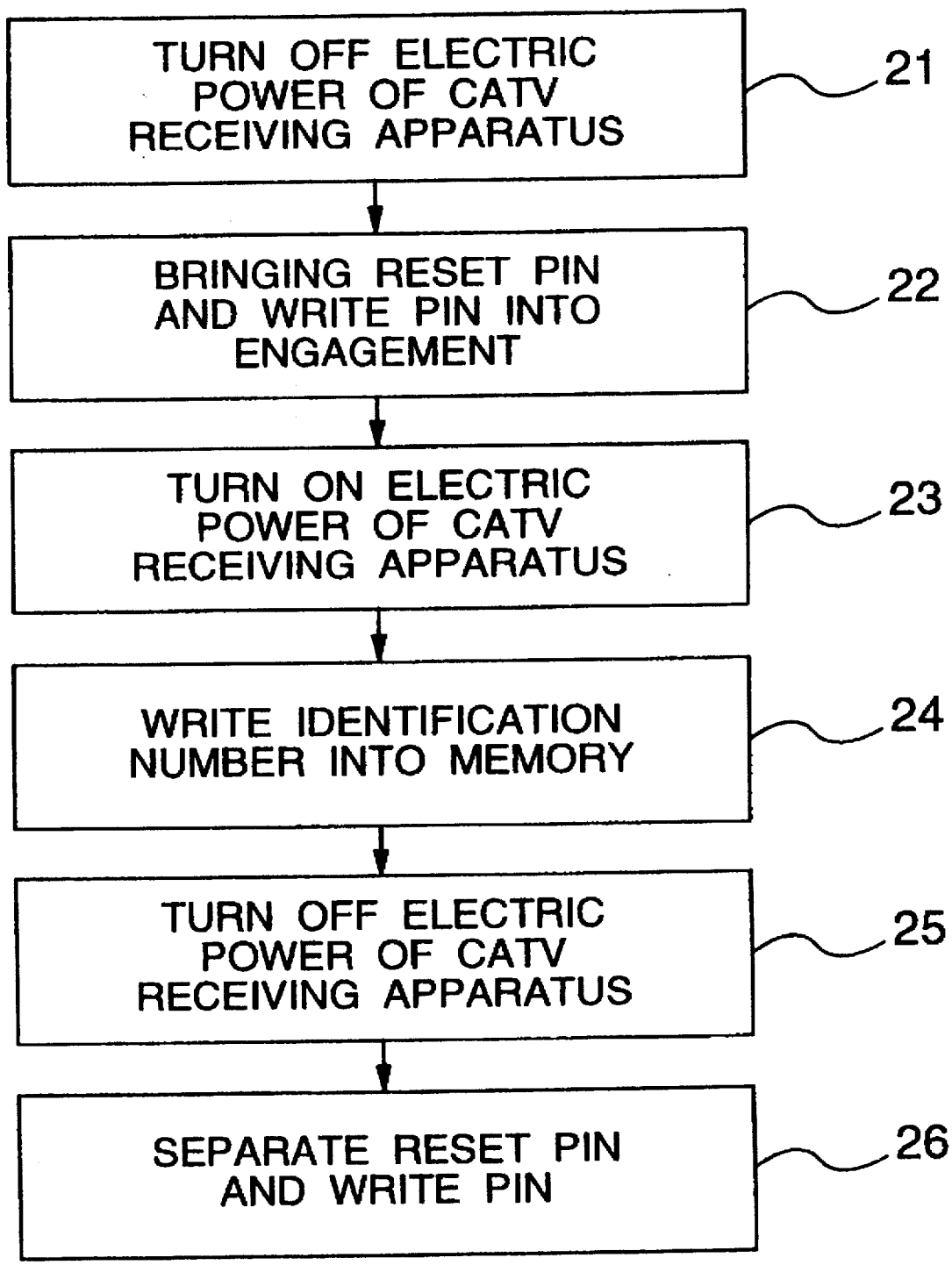
FIG. 4 is a flow chart showing the steps of a method of writing an identification number of a CATV receiving apparatus according to a second embodiment of the present invention.
Figure 5:
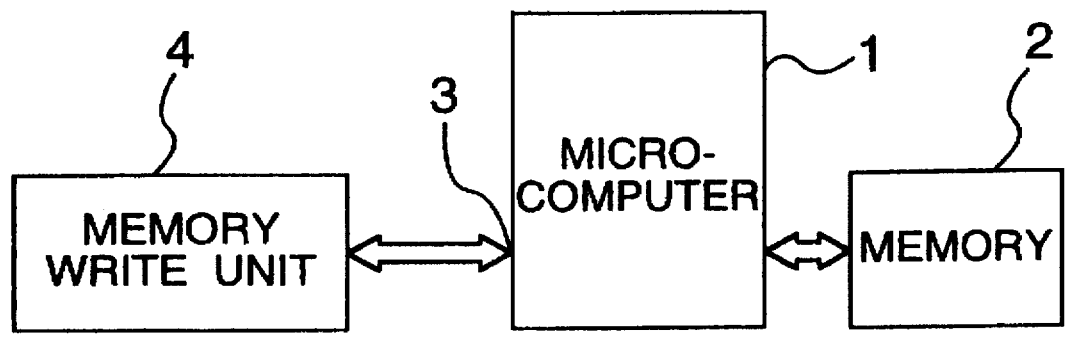
FIG. 5 is a block diagram for explaining a conventional method of writing an identification number of a CATV receiving apparatus.

When the CATV receiving apparatus constructed as shown in FIGS. 2 and 3 illustrative of the first embodiment is conveyed through the production process while being supplied with electric power and comes into the step of writing an identification number into the memory 8, the identification number is written directly into the memory 8 by means of the memory write unit 10 which is always supplied with electric power. This will be detailed below. More particularly, in the electronic apparatus having the memory 8 and the microcomputer 7 for controlling the memory 8, an identification number write operation proceeds as shown in FIG. 4 through a first step 21 of turning off electric power of the electronic apparatus, a second step 22 of bringing the reset terminal 9 connected to the reset signal terminal of the microcomputer 7 into engagement with earth through the reset pin 14 of the write unit 10 and bringing the write pin 13 of the memory write unit 10 into engagement with the input/output terminal 8a of the memory 8 after the first step 21, a third step 23 of turning on electric power of the electronic apparatus after the second step 22, a fourth step 24 of writing a preset identification number of the electronic apparatus into the memory 8 through the write pin 13 after the third step 23, a fifth step 25 of turning off electric power of the electronic apparatus after the fourth step 24, and a sixth step 26 of separating the reset terminal 9 in engagement with the reset pin 14 from earth and separating the write pin 13 from the input/output terminal 8a of the memory 8 after the fifth step 25.

Accordingly, since electric power of the CATV receiving apparatus is first turned off in the first step and subsequently, in the second step, the reset pin 14 and the write pin 13 are brought into engagement, the CATV receiving apparatus will not be affected adversely when electric power is turned on. Then, in the fourth step 24, the preset identification number of the CATV receiving apparatus is written directly into the memory 8 through the write pin 13 and hence the microcomputer 7 need not start any identification number write program and a rapid write operation can be ensured.

In the present embodiment, too, no identification number write program is required for the microcomputer 7 and therefore, reduction in the capacity of the control program can be realized.

Further, whether an identification number actually written into the memory 8 by means of the memory write unit 10 coincides with the identification number preset in the memory write unit 10 is decided between the fourth and fifth steps 24 and 25, and the next procedure is undertaken on the basis of a result of the decision. More particularly, when the coincidence occurs, the program proceeds to the fifth step 25 but when the non-coincidence occurs, a cycle of operation proceeds in which write operation is repeated and then the above coincidence inspection is carried out. If the coincidence cannot be settled even after the cycle of operation has been effected three times, an alarm is rung to call the operator. The operator judges the conditions and takes proper measures.

In this manner, the written identification number can be inspected as to whether it is correct. For the identification number, the memory write unit 10 can operate in one mode in which a suitable value is set case by case by the operator or the other mode in which an identification number is written and after the coincidence is settled, the identification number is counted up by one. The write pin 13 is caused to engage the input/output terminal 8a of the memory 8 three times, making it possible to remove a coating on the surface of the input/output terminal 8a and ensure steady contact. Accordingly, as in the case of the embodiment 1, through use of the write method of the present embodiment, traces of engagement of the write pin 13 can also remain on the input/output terminal 8a of memory 8 which has undergone a write operation.

In addition, by making slightly longer (by 1 mm in the present embodiment) an earth pin element of the write pin 13 (the earth pin element being one of pin elements of the write pin 13) than the other pin elements, the earth pin element can be brought into engagement earlier than the other pin elements when the write pin 13 is brought into engagement with the input/output terminal 8a but can be separated later than the other pin elements when the write pin 13 is separated from the input/output terminal 8a. Thus, both of the CATV receiving apparatus and the memory write unit 10 can first be maintained at the same earth potential and so stable electrical connection can be realized.

Further, in the present embodiment, too, the microcomputer 7 has means for inhibiting write operation to an identification number write address on the memory 8. Accordingly, the identification number cannot be freely changed externally without using the write unit 10 and therefore safety can be improved.

The identification number can be prevented from being read to the outside through the microcomputer 7. In other words, in the ordinary use, coincidence of the identification number can be settled only inside the microcomputer 7 so as to further improve safety.

INDUSTRIAL APPLICABILITY

As described above, according to the present invention, the method of writing an identification number of an electronic apparatus having a memory and a microcomputer for controlling the memory comprises the first step of resetting the microcomputer, the second step of bringing the write pin of the memory write unit into engagement with the input/output terminal of the memory after the first step, the third step of writing a preset identification number of the electronic apparatus into the memory through the write pin after the second step, the fourth step of separating the write pin from the input/output terminal of the memory after the third step, and the fifth step of releasing the microcomputer from the resetting after the fourth step. Accordingly, in accordance with this method, the write pin of the memory write unit is brought into direct engagement with the input/output terminal of the memory in the second step and subsequently, in the third step, the preset identification number of the electronic apparatus is written into the memory through the write pin, so that the microcomputer need not start any identification number write program and hence a rapid write operation can be ensured.

Further, no identification number write program is required for the microcomputer and therefore, reduction in the capacity of the control program can be realized.

We claim:

1. A method of writing an identification number of an electronic apparatus having an electrically writable memory device (hereinafter referred to as memory) and a microcomputer for controlling said memory, comprising:

a first step of resetting said microcomputer;

a second step of bringing a write pin of a memory write unit into engagement with an input/output terminal of said memory after the first step;

a third step of writing a preset identification number of said electronic apparatus into said memory through said write pin after the second step;

a fourth step of separating said write pin from said input/output terminal of said memory after the third step; and a fifth step of releasing said microcomputer from the resetting after the fourth step.

2. An electronic apparatus identification number writing method according to claim 1, wherein whether an identification number written into said memory coincides with the identification number preset in said memory write unit is decided between the third and fourth steps, and the next procedure is undertaken on the basis of a result of the decision.

3. An electronic apparatus identification number writing method according to claim 1, wherein said write pin is brought into engagement with said input/output terminal of said memory plural times.

4. An electronic apparatus identification number writing method according to claim 1, wherein an earth pin element of said write pin is brought into engagement earlier than the other pin elements when said write pin is brought into engagement with said input/output terminal but is separated later than the other pin elements when said write pin is separated from said input/output terminal.

5. An electronic apparatus identification number writing method according to claim 1, wherein said microcomputer has means for inhibiting write operation to an identification number write address on said memory.

6. A method of writing an identification number of an electronic apparatus having a memory and a microcomputer for controlling said memory, comprising:

a first step of turning off electric power of said electronic apparatus;

a second step of bringing a reset terminal of said microcomputer into engagement with earth and bringing a write pin of a memory write unit into engagement with an input/output terminal of said memory after the first step;

a third step of turning on electric power of said electronic apparatus after the second step;

a fourth step of writing a preset identification number of said electronic apparatus into said memory through said write pin after the third step;

a fifth step of turning off electric power of said electronic apparatus after the fourth step; and a sixth step of separating said reset terminal from earth and separating said write pin from said input/output terminal of said memory after the fifth step.

7. An electronic apparatus identification number writing method according to claim 6, wherein whether an identification number written into said memory coincides with the identification number preset in said memory write unit is decided between the fourth and fifth steps, and the next procedure is undertaken on the basis of a result of the decision.

8. An electronic apparatus identification number writing method according to claim 6, wherein said write pin is brought into engagement with said input/output terminal of said memory plural times.

9. An electronic apparatus identification number writing method according to claim 6, wherein an earth pin element of said write pin is brought into engagement earlier than the other pin elements when said write pin is brought into engagement with said input/output terminal but is separated later than the other pin elements when said write pin is separated from said input/output terminal.

10. An electronic apparatus identification number writing method according to claim 6, wherein said microcomputer has means for inhibiting write operation to an identification number write address on said memory.

* * * * *